United States Patent
Hirai et al.

(10) Patent No.: US 10,005,693 B2
(45) Date of Patent: Jun. 26, 2018

(54) OPAQUE QUARTZ GLASS AND METHOD FOR ITS PRODUCTION

(71) Applicant: TOSOH CORPORATION, Shunan-shi, Yamaguchi (JP)

(72) Inventors: Satori Hirai, Kanagawa (JP); Nobusuke Yamada, Kanagawa (JP); Kazuyoshi Arai, Kanagawa (JP)

(73) Assignee: TOSOH CORPORATION, Shunan-shi, Yamaguchi (JP)

( * ) Notice: Subject to any disclaimer, the term of this patent is extended or adjusted under 35 U.S.C. 154(b) by 0 days. days.

(21) Appl. No.: 15/118,368

(22) PCT Filed: Feb. 16, 2015

(86) PCT No.: PCT/JP2015/054129
§ 371 (c)(1),
(2) Date: Aug. 11, 2016

(87) PCT Pub. No.: WO2015/122517
PCT Pub. Date: Aug. 20, 2015

(65) Prior Publication Data
US 2017/0174560 A1    Jun. 22, 2017

(30) Foreign Application Priority Data

Feb. 17, 2014 (JP) ................................. 2014-027910
Mar. 3, 2014 (JP) ................................. 2014-040971
Apr. 30, 2014 (JP) ................................. 2014-094127

(51) Int. Cl.
C03C 11/00 (2006.01)
C03B 19/06 (2006.01)
C03B 19/08 (2006.01)

(52) U.S. Cl.
CPC ............ *C03C 11/00* (2013.01); *C03B 19/066* (2013.01); *C03B 19/08* (2013.01); *C03C 2201/02* (2013.01)

(58) Field of Classification Search
CPC ............ C03C 2201/24; C03C 2201/80; C03C 2203/10; Y10T 428/1317; Y10S 65/08
See application file for complete search history.

(56) References Cited

U.S. PATENT DOCUMENTS 5,497,004 A * 3/1996 Rudolph ................... B22C 9/12
                                                                    250/372
5,972,488 A    10/1999 Nagata et al.
(Continued)

FOREIGN PATENT DOCUMENTS

CN    1066696 C     6/2001
JP    4-65328 A     3/1992
(Continued)

OTHER PUBLICATIONS

International Preliminary Report on Patentability, dated Aug. 23, 2016, from the International Bureau in counterpart International application No. PCT/JP2015/054129.
(Continued)

*Primary Examiner* — Noah S Wiese
(74) *Attorney, Agent, or Firm* — Sughrue Mion, PLLC

(57) ABSTRACT

To provide opaque quartz glass having no water absorbing properties and being excellent in infrared light shielding properties, and a method for its production. In the production of opaque quartz glass of the present invention, a fine amorphous silica powder and a pore forming agent are mixed, then molded and heated at a predetermined temperature, to obtain opaque quartz glass wherein contained pores are closed pores, the average pore size of pores is from 5 to 20 μm, and the content density of pores is high, whereby the heat shielding properties are high.

25 Claims, 10 Drawing Sheets

(56) References Cited

U.S. PATENT DOCUMENTS

| | | | | |
|---|---|---|---|---|
| 6,012,304 | A * | 1/2000 | Loxley | C03B 19/06 264/653 |
| 6,312,775 | B1 * | 11/2001 | Nagata | C03B 19/09 428/312.6 |
| 6,355,587 | B1 * | 3/2002 | Loxley | C03B 19/06 264/653 |
| 6,380,110 | B1 * | 4/2002 | Werdecker | C03B 19/1065 501/54 |
| 2013/0085056 | A1 | 4/2013 | Kreuzberger | |

FOREIGN PATENT DOCUMENTS

| | | |
|---|---|---|
| JP | 5-254882 A | 10/1993 |
| JP | 7-61827 A | 3/1995 |
| JP | 7-267724 A | 10/1995 |
| JP | 9-12325 A | 1/1997 |
| JP | 10-203839 A | 8/1998 |
| JP | 11-199252 A | 7/1999 |
| JP | 2005-139018 A | 6/2005 |
| JP | 2014-91634 A | 5/2014 |
| WO | 2008/069194 A1 | 6/2008 |

OTHER PUBLICATIONS

International Search Report for PCT/JP2015/054129 dated May 19, 2015.
Communication dated Feb. 2, 2018 from the State Intellectual Property Office of the P.R.C. in counterpart application No. 201580009038.8.
Wang et al., "Porous Biological Material", China Machine Press, 1st ed., May 2012, p. 71. (3 pages total). Cited in CN comm. Feb. 2, 2018 in 20158009038.8.

* cited by examiner

OPAQUE QUARTZ GLASS AND METHOD FOR ITS PRODUCTION

CROSS REFERENCE TO RELATED APPLICATIONS

This application is a National Stage of International Application No. PCT/JP2015/054129 filed Feb. 16, 2016, claiming priority based on Japanese Patent Application Nos. 2014-027910 filed Feb. 17, 2014, 2014-040971 filed Mar. 3, 2014, and 2014-094127 filed Apr. 30, 2014, the contents of all of which are incorporated herein by reference in their entirety.

TECHNICAL FIELD

The present invention relates to opaque quartz glass having no water absorbing properties and being excellent in infrared light-shielding properties, and a method for its production.

BACKGROUND ART

Opaque quartz glass is used for applications requiring heat shielding properties. The heat shielding properties are related to infrared light-shielding properties, so that the higher the infrared light-shielding properties of opaque quartz glass, the better the heat shielding properties.

Heretofore, as a method for producing opaque quartz glass, a method of adding a blowing agent such as silicon nitride to crystalline silica or amorphous silica, followed by melting, has been known (e.g. Patent Documents 1 to 3). However, opaque quartz glass produced by such a production method has had a problem such that since pores are formed by vaporization of a blowing agent, the average size of pores tends to be large, and with one having practically durable strength, the content density of pores tends to be low, and accordingly the infrared light-shielding properties tend to be low.

On the other hand, a method has also been proposed wherein, without adding a blowing agent, a shaped body of amorphous silica powder is heated at a temperature below its melting temperature, and the heat treatment is interrupted before being completely densified, to be partially sintered (e.g. Patent Document 4). In opaque quartz glass produced by such a production method, it is possible to reduce the average size of the pores, but there is a problem such that if sintering is carried out until pores become closed pores, the content density of pores tends to be low, and the infrared light-shielding properties tend to be degraded, or a problem such that the average size of pores tends to be too small, so that the light shielding properties against infrared light with long wavelengths tend to be low. Further, in such a method, there is a problem such that depending upon the temperature distribution in the electric furnace, a density distribution in the sintered body of opaque quartz glass tends to be formed, whereby it is difficult to obtain homogeneous opaque quartz glass in a large size.

Further, a method of heating and calcining a silica glass porous body under high pressure condition (e.g. Patent Document 5) has also been proposed, but in opaque quartz glass produced by such a production method, the transmittance of light with a wavelength of from 200 to 5,000 nm is from 0.5 to 2.0%, thus indicating a problem that the light-shielding properties against infrared light on the longer wavelength side tend to be low. Further, this method requires a special apparatus for conducting the high-pressure calcination and cannot be said to be a simple method.

PRIOR ART DOCUMENTS

Patent Documents

Patent Document 1: JP-A-4-65328
Patent Document 2: JP-A-5-254882
Patent Document 3: JP-A-7-61827
Patent Document 4: JP-A-7-267724
Patent Document 5: WO2008/069194

DISCLOSURE OF INVENTION

Technical Problem

The present invention is to provide opaque silica glass having no water absorbing properties and being excellent in infrared light-shielding properties, and a method for its production.

Solution to Problem

The present inventors have found that by mixing and molding amorphous silica powder and a pore forming agent powder (which may be hereinafter referred to simply as a pore forming agent), followed by sintering at a predetermined temperature, it is possible to obtain opaque quartz glass for shielding infrared light over a wide wavelength range, wherein pores contained are closed pores, and the content density of pores is high, and thus have arrived at accomplishing the present invention.

That is, the present invention resides in the following (1) to (25).

(1) Opaque quartz glass characterized in that the density is at least 1.95 g/cm$^3$ and at most 2.15 g/cm$^3$, the average pore diameter is from 5 to 20 μm, the linear transmittance at a wavelength of from 1.5 μm to 5 μm when the sample thickness is 1 mm, is at most 1%, and the water absorption is at most 0.1 wt %.
(2) The opaque quartz glass according to (1), characterized in that the density is at least 1.97 g/cm$^3$ and at most 2.08 g/cm$^3$.
(3) The opaque quartz glass according to (1) or (2), characterized in that the average pore diameter is from 9 to 15 μm.
(4) The opaque quartz glass according to any one of (1) to (3), characterized in that the diffuse reflectance at a wavelength of 2 μm when the sample thickness is 3 mm, is at least 70%.
(5) The opaque quartz glass according to any one of (1) to (4), characterized in that the cristobalite content is at most 2%.
(6) The opaque quartz glass according to any one of (1) to (5), characterized in that the coefficient of variation of density is at most 0.02.
(7) The opaque quartz glass according to any one of (1) to (6), characterized in that the content of each metal impurity of Na, Mg, Al, K, Ca, Cr, Fe, Cu and Zn is at most 10 ppm.
(8) The opaque quartz glass according to any one of (1) to (7), characterized in that the content of each metal impurity of Na, Mg, Al, K, Ca, Cr, Fe, Cu and Zn is at most 1 ppm.
(9) A method for producing opaque quartz glass as defined in any one of (1) to (8), characterized by mixing a pore forming agent powder to an amorphous silica powder so that its volume ratio to the amorphous silica powder would be at least 0.04, molding the mixed powder, and heating at a temperature at which the pore forming agent is burnt off, to remove the pore forming agent, followed by sintering at a temperature at which sintering of the silica powder progresses, until pores contained in the sintered body become closed pores.

(10) The method for producing opaque quartz glass according to (9), characterized in that the pore forming agent powder has an average particle size of from 5 to 40 μm, and the addition amount of the pore forming agent powder is from 0.04 to 0.35 by volume ratio to the amorphous silica powder.

(11) The method for producing opaque quartz glass according to (9) or (10), characterized in that the pore forming agent powder has an average particle size of from 9 to 30 μm.

(12) The method for producing opaque quartz glass according to any one of (9) to (11), characterized in that the pore forming agent powder is a graphite powder.

(13) The method for producing opaque quartz glass according to any one of (9) to (12), characterized in that the amount of each metal impurity of Na, Mg, Al, K, Ca, Cr, Fe, Cu and Zn contained in the mixed powder, is at most 10 ppm.

(14) The method for producing opaque quartz glass according to any one of (9) to (13), characterized in that the production is conducted under such a condition that the cristobalite content in the sintered body would be at most 2%.

(15) The method for producing opaque quartz glass according to any one of (9) to (14), characterized in that the aspect ratio of the pore forming agent powder is at most 3.0.

(16) The method for producing opaque quartz glass according to any one of (9) to (15), characterized in that the atmosphere for the heating is an oxidizing atmosphere.

(17) The method for producing opaque quartz glass according to any one of (9) to (16), characterized in that the average particle size of the amorphous silica powder is at most 20 μm.

(18) Quartz glass characterized by having a transparent quartz glass layer on a part or whole of the surface of the opaque quartz glass as defined in any one of (1) to (8).

(19) A member for a heat treatment apparatus, characterized in that a part or whole thereof is formed of the opaque quartz glass as defined in any one of (1) to (8).

(20) A member for a semiconductor producing apparatus, characterized in that a part or whole thereof is formed of the opaque quartz glass as defined in any one of (1) to (8).

(21) A member for a FPD producing apparatus, characterized in that a part or whole thereof is formed of the opaque quartz glass as defined in any one of (1) to (8).

(22) A member for a solar cell producing apparatus, characterized in that a part or whole thereof is formed of the opaque quartz glass as defined in any one of (1) to (8).

(23) A member for a LED producing apparatus, characterized in that a part or whole thereof is formed of the opaque quartz glass as defined in any one of (1) to (8).

(24) A member for a MEMS producing apparatus, characterized in that a part or whole thereof is formed of the opaque quartz glass as defined in any one of (1) to (8).

(25) An optical member characterized in that a part or whole thereof is formed of the opaque quartz glass as defined in any one of (1) to (8).

Advantageous Effects of Invention

The opaque quartz glass of the present invention is excellent in heat shielding properties and thus can be used as a constituting material for various kinds of furnace core tubes, jigs and containers such as bell jars, which are used particularly in the semiconductor production fields, including e.g. a furnace core tube for silicon wafer processing or its flange portion, a heat shielding fin, a liquid chemical purification tube, a crucible for melting silicon, etc.

Figure 1:
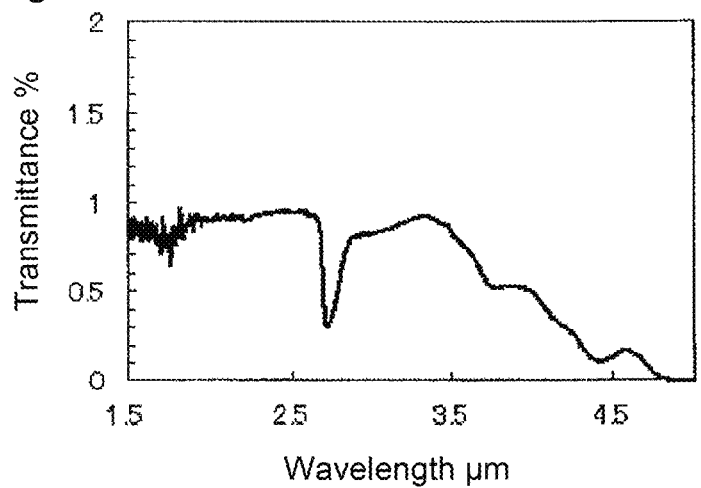
FIG. 1 is an infrared spectrum of the opaque quartz glass produced in Example 1.

μm, of opaque quartz glasses produced in Examples 1 to 4 and 10 to 13, and Comparative Examples 2 to 4.

DESCRIPTION OF EMBODIMENTS

Now, the present invention will be described in more detail.

The present invention provides opaque quartz glass characterized in that the density is at least 1.95 g/cm$^3$ and at most 2.15 g/cm$^3$, the average pore diameter is from 5 to 20 μm, the linear transmittance at a wavelength of from 1.5 μm to 5 μm when the sample thickness is 1 mm, is at most 1%, and the water absorption is at most 0.1 wt %.

When the average diameter of pores is smaller than the wavelength of light, the scattering intensity is dependent on the wavelength, and infrared light having a long wavelength tends to be hardly scattered as compared to infrared light having a short wavelength. On the other hand, when the average diameter of pores is comparable to the wavelength of light or larger than the wavelength of light, the wavelength dependency of the scattering intensity is small. Further, when comparing opaque quartz glass of the same density, the scattering intensity tends to increase with one having a smaller average diameter of pores. This is considered to be such that the content density of pores becomes higher with one having a smaller average diameter of pores.

Therefore, in order to improve the light shielding properties of opaque quartz glass, it is effective that the glass has pores having at least the same size as infrared light to be shielded and that the content density of pores is high. Since the wavelength of infrared light to be shielded is from 1.5 to 5 μm, the average pore diameter is required to be at least 5 μm. On the other hand, if the average pore diameter becomes large and the content density of pores becomes too high, the density of the opaque quartz glass tends to be low, and the strength tends to be low, such being undesirable. In consideration of the balance between the infrared light-shielding properties and the strength of the opaque quartz glass, the average pore diameter is required to be from 5 to 20 μm, preferably from 9 to 15 μm. The density is required to be at least 1.95 g/cm$^3$ and at most 2.15 g/cm$^3$, preferably at least 1.97 g/cm$^3$ and at most 2.08 g/cm$^3$.

The opaque quartz glass of the present invention is preferably such that the linear transmittance at a wavelength of from 1.5 μm to 5 μm with a sample thickness of 1 mm is at most 1%. In other words, the opaque quartz glass of the present invention is desired to be such that at any wavelength of from 1.5 μm to 5 μm, the linear transmittance with a sample thickness of 1 mm does not exceed 1%. The heat shielding properties is related to the transmittance of infrared light, and the opaque quartz glass of the present invention wherein the linear transmittance at a wavelength of from 1.5 μm to 5 μm with a sample thickness of 1 mm is at most 1%, is excellent in the heat shielding properties.

Pores contained in the opaque quartz glass of the present invention are preferably closed pores, and it is characterized that the water absorption is at most 0.1 wt %. When the water absorption in the opaque quartz glass is at most 0.1 wt %, it is less likely to adsorb impurities during mechanical processing such as grinding or polishing of the opaque quartz glass, such being preferred in that no purification treatment is required after the processing.

The opaque quartz glass of the present invention is preferably such that the diffuse reflectance at a wavelength of 2 μm with a sample thickness of 3 mm, is at least 70%. The diffuse reflectance is also one of indices showing heat shielding properties, and the opaque quartz glass of the present invention having a diffuse reflectance of at least 70% is expected to have high thermal efficiency and thermal uniformity when used, for example, for a heat treatment container.

The opaque quartz glass of the present invention preferably has a cristobalite content of at most 2%. When the cristobalite content is at most 2%, it is possible to obtain a sintered body of a large size without cracking.

The opaque quartz glass of the present invention is preferably such that the content of each metal impurity of Na, Mg, Al, K, Ca, Cr, Fe, Cu and Zn is at most 10 ppm, more preferably at most 1 ppm. The lower the amount of metal impurities, the better, since, for example, when used as a semiconductor heat treatment jig, it is thereby possible to keep contamination with metal impurities to a semiconductor to be low.

The opaque quartz glass of the present invention is preferably such that the coefficient of variation of density in the sintered body is at most 0.02. In the opaque quartz glass using the pore forming agent, the density distribution becomes small as compared with one not using the pore forming agent, and the coefficient of variation of density is small, whereby its glass properties become homogeneous, and it can be used for various applications.

Now, the method for producing opaque quartz glass of the present invention will be described.

The method of producing opaque quartz glass of the present invention is characterized by mixing a pore forming agent powder to an amorphous silica powder so that its volume ratio to the amorphous silica powder would be at least 0.04, molding the mixed powder, and heating at a temperature at which the pore forming agent is burnt off, to remove the pore forming agent, followed by sintering at a temperature at which sintering of the silica powder progresses, until pores contained in the sintered body become closed pores.

Hereinafter, with respect to the method for producing the opaque quartz glass of the present invention, each step will be described in detail. Here, as is true in all steps, so as not to let contamination with impurities occur during the process, it is necessary to adequately select the apparatus, etc. to be used.

(1) Selection of Raw Material Powders

Firstly, an amorphous silica powder to be used in the present invention is selected. The method of producing the amorphous silica powder is not particularly limited, and, for example, an amorphous silica powder produced by hydrolysis of a silicon alkoxide, or an amorphous silica powder prepared by hydrolyzing silicon tetrachloride in an oxyhydrogen flame, etc., may be used. Further, a powder obtained by pulverizing quartz glass may be used.

The average particle size of the amorphous silica powder to be used in the present invention is preferably at most 20 μm. If the particle size is too large, a high temperature and a long time are required for sintering, such being undesirable. Amorphous silica powders produced by various production methods can be adjusted to the above particle size by pulverization and classification by means of a jet mill, a ball mill, a bead mill, etc.

Then, a pore forming agent powder to be used in the present invention is selected.

The particle size of the pore forming agent of the present invention is closely related to the average pore diameter in the opaque quartz glass, and it is necessary to use a pore forming agent having a particle size which is equal to or larger than the average pore diameter desired to be obtained. The reason for using a pore forming agent having a particle size of at least the pore diameter is such that in the sintering stage after disappearance of the pore forming agent, there may be a case where the pores become smaller than the original size. When a spherical powder of graphite or amorphous carbon is used as the pore forming agent, in order to obtain opaque quartz glass having an average pore diameter of from 5 to 20 μm, the particle size of the pore forming agent is preferably from 5 to 40 μm, more preferably from 9 to 30 μm.

The type of the pore forming agent in the present invention is not particularly limited, so long as it disappears as thermally decomposed and vaporized at a temperature below the sintering temperature of amorphous silica, and it is possible to use graphite powder or amorphous carbon powder, a phenolic resin powder, an acrylic resin powder, a polystyrene powder, etc. Among these, graphite powder or amorphous carbon powder is preferred in that a gas component generated during its pyrolysis is harmless and odorless.

The purity of the amorphous silica powder and the pore forming agent powder to be used in the present invention is preferably such that the amount of each metal impurity of Na, Mg, Al, K, Ca, Cr, Fe, Cu and Zn contained in the mixed powder of the amorphous silica powder and the pore forming agent powder, is at most 10 ppm, more preferably at most 1 ppm. If impurity elements such as alkali metal elements, alkaline-earth elements, transition metal elements are contained at a high concentration in quartz glass, cristobalite will be generated in the quartz glass at a temperature of at least about 1,300° C. Cristobalite undergoes volume shrinkage due to phase transition from the high temperature type to the low temperature type at a temperature of from 230 to 300° C. If the amount of cristobalite contained in the opaque quartz glass is more than 2%, cracks tend to be formed in the calcined body due to such volume shrinkage. Especially when the calcined body is large, for example, in opaque quartz glass having a diameter of at least 140 mm, this tendency is remarkable. If the purity of the amorphous silica powder and the pore forming agent powder is low, it is preferred to conduct purification treatment. The method for purification is not particularly limited, and chemical processing or dry gas purification may be carried out, or transpiration of impurities may be conducted by high temperature calcination. Here, it should be mentioned that even if the amount of metal impurities contained in opaque quartz glass is small, there may be a case where cristobalite is substantially formed due to e.g. the moisture content or the atmosphere in the furnace, the purity of the furnace material, the calcining time, etc.

The shape of the pore forming agent in the present invention is preferably spherical in that it can be mixed homogeneously with the amorphous silica powder, and pressure transmission can be well carried out when molding the powder by pressure, and the aspect ratio representing a ratio of the major axis to the minor axis of the particles is preferably at most 3.0.

(2) Mixing of Raw Material Powders

Then, the selected amorphous silica powder and pore forming agent powder are mixed. The addition amount of the pore forming agent powder has to be adjusted so that its volume ratio to the amorphous silica powder would be at least 0.04. However, the preferred range varies depending upon the type or the average particle size of the pore forming agent, and when the pore forming agent powder is graphite powder or an amorphous carbon powder having an average particle size of from 5 to 40 μm, its volume ratio to the amorphous silica powder is preferably from 0.04 to 0.35. If the addition amount of the pore forming agent powder is too small, the amount of pores contained in the opaque quartz glass tends to be small so that the infrared light-shielding properties tend to be low, such being undesirable. On the other hand, if the addition amount is too large, the density of the opaque quartz glass becomes too low, such being undesirable.

The method for mixing the amorphous silica powder and the pore forming agent is not particularly limited, and a rocking mixer, a cross mixer, a pot mill, a ball mill, etc. may be used.

(3) Molding of Mixed Powder

Then, the mixed powder will be molded. As the molding method, a casting molding method, a cold isostatic pressing (CIP) method, or a dry pressing such as a mold pressing method, may be used. In particular, it is preferred to use a CIP method for molding in the present invention, in that it is possible to easily obtain a molded body by a less number of steps. Further, as a method for producing a molded body of a disc shape, cylindrical shape or ring shape by using a CIP method, it is possible to use, but not limited to, a molding method using a plastically deformable mold such as foamed styrol (e.g. JP-A-4-105797), or a method of using an assembly-type mold frame wherein a bottom plate is formed of a material with less compression deformable than the upper punch (e.g. see JP-A-2006-241595).

(4) Sintering of Molded Body

Then, a molded body molded by the above method is heated at a predetermined temperature to eliminate the pore forming agent contained in the molded body. The heating temperature varies depending on the type of the pore forming agent, and, for example, in a case where graphite powder or amorphous carbon is used as the pore forming agent, the heating is carried out at a temperature of from 700° C. to 1,000° C.

The heating to eliminate the pore forming agent is carried out for an optional time depending upon the type of the pore forming agent, the addition amount of the pore forming agent, the size of the molded body and the heating temperature, and, for example, in a case where a graphite powder or an amorphous carbon is used as the pore forming agent, its addition amount is from 0.1 to 0.2 by volume ratio to the amorphous silica powder, the volume of the molded body is $2 \times 10^3$ cm$^3$, and the heating temperature is 800° C., the heating is carried out for from 24 hours to 100 hours.

Then, the molded body having the pore forming agent eliminated, is calcined at a predetermined temperature, until pores contained in the sintered body become closed pores. The calcination temperature is preferably from 1,350 to 1,500° C. If the calcination temperature is lower than 1,350° C., calcination for a long time is required until pores become closed pores, such being undesirable. If the calcination temperature exceeds 1,500° C., the amount of cristobalite contained in the calcined body tends to be large, and cracks are likely to be formed in the calcined body by volume shrinkage due to phase transition from the high-temperature type to the low-temperature type of cristobalite, such being undesirable.

The calcination is conducted for an optional time depending upon the addition amount of the pore forming agent or the calcination temperature, and, for example, in a case where the addition amount is from 0.1 to 0.2 by volume ratio to the amorphous silica powder, and the calcination temperature is from 1,350 to 1,500° C., the calcination is carried out for a calcination time of from 1 hour to 20 hours. If the calcination time is too short, sintering does not proceed sufficiently, and pores become open pores, such being not desirable. On the other hand, if the calcination time is too long, sintering tends to proceed too much, and pores tend to be small, whereby the infrared light-shielding properties tend to be low, and the amount of cristobalite contained in the calcined body tends to be large, and cracks are likely to be formed in the sintered body by volume shrinkage due to the phase transition from the high temperature type to the low temperature type of cristobalite, such being undesirable.

The heating to eliminate the pore forming agent is carried out in an atmosphere wherein the pore forming agent is burnt off, and, for example, in the case of using a graphite powder or an amorphous carbon as the pore forming agent, it is carried out in an atmosphere wherein oxygen is present.

The atmosphere for calcination for closing pores is not particularly limited, and such calcination may be carried out under an air atmosphere, a nitrogen atmosphere or a vacuum atmosphere.

The opaque quartz glass of the present invention is excellent in heat shielding properties, and therefore can be used as e.g. a member for heat treatment apparatus, a member for semiconductor production equipment, a member for FPD production equipment, a member or solar cell production equipment, a member for LED production equipment, a member for MEMS production equipment, an optical member, etc. Specifically, a constituting material of a flange, a heat insulation fin, a furnace core tube, a soaking tube, a liquid chemical purification tube, etc., or a constituting material of a crucible for melting silicon, etc. may be mentioned.

As the above mentioned member, the opaque quartz glass may be used alone, or may be used by forming a transparent quartz glass layer on a part or whole of the opaque quartz glass surface. Such a transparent quartz glass layer is formed in consideration of a situation that when the opaque quartz glass is to be used for an application where a sealing property is required, complete sealing tends to be difficult as pores contained in the opaque quartz glass are exposed to the sealing surface even when a packing is used. Further, in a cleaning step performed at any time in the course of using the opaque quartz glass in various applications, pores exposed on the outermost surface are likely to be scraped, and the surface of the opaque quartz glass tends to partly fall off thus causing generation of particles. In order to prevent such a trouble from happening, a transparent quartz glass layer may be formed.

The method for forming a transparent quartz glass layer on the opaque quartz glass is not particularly limited, and may, for example, be a method of melting the surface of the opaque glass by an oxyhydrogen flame to form a transparent quartz glass, a method of heating an opaque quartz glass and a transparent quartz glass in an oxyhydrogen flame or in an electric furnace to bond them, or a method of molding and calcining by disposing a mixed powder of an amorphous silica powder and a pore forming agent to form an opaque quartz glass and an amorphous silica powder to form a transparent quartz glass at positions corresponding to the transparent portion and the opaque portion in the desired glass.

EXAMPLES

Now, the present invention will be described specifically with reference to Examples, but the present invention is not limited to such Examples.

As the average particle size of an amorphous silica powder, a value of median diameter (D50) measured by means of a laser diffraction particle size distribution measuring apparatus (trade name "SALD-7100", manufactured by Shimadzu Corporation) was used.

The aspect ratio of a pore forming agent powder was obtained by (major axis diameter/minor axis diameter) by observing the major axis diameter and the minor axis diameter by means of an optical microscope.

The density and water absorption of an opaque quartz glass were measured by the following method. Firstly, after drying the sample, the mass W1 is measured. Then, the sample is boiled for two hours by maintaining it in water and then left to cool to room temperature, whereupon the mass W2 of this sample in water is measured. Then, a water-repellent organic solvent is applied to the sample, followed by drying, and then, the mass W3 of this sample in water is measured. The density and water absorption will be obtained by the following formulae from W1, W2 and W3.

$$\text{Density} = W1/((W1-W3)/\rho)$$

$$\text{Water absorption (\%)} = ((W2-W3)/W1) \times 100$$

Here, $\rho$ is the density of water at the water temperature at the time of measurement.

The coefficient of variation of density in a sintered body of opaque quartz glass was obtained by (standard deviation of density/average value of density) by measuring densities at 27 points obtained by dividing the sintered body from the central portion towards the outer peripheral portion and from the top portion towards the bottom portion.

The infrared spectrum of an opaque quartz glass was measured by using an FTIR apparatus (trade name "IRPrestige-21", manufactured by Shimadzu Corporation). A measurement sample was processed by surface grinding and finished by 140th finishing diamond wheel, and its thickness was 1 mm. Here, as a measurement sample, a portion having a density of average density was used.

The reflection spectrum of opaque quartz glass was measured by a diffuse reflection method using a visible-ultraviolet spectrophotometer (trade name "UV-3100PC", manufactured by Shimadzu Corporation). The angle of incidence was set to be 8°, and the slit width was set to be 7.5 nm within a range of measurement wavelength of from 400 to 860 nm and 30 nm within a range of measurement wavelength of 860 to 2,500 nm. A measurement sample was processed by surface grinding and finished by a 140th finishing diamond wheel, and its thickness was 3 mm.

The average pore diameter in opaque quartz glass was calculated by image analysis of an optical microscope image, by optically polishing a cut surface of the opaque quartz glass. For the image analysis, using ImageJ 1.47v (National Institutes of Health), an average area of pores photographed in an optical microscope image was obtained, and from this average area, a pore diameter assuming pores to be circular, was obtained and adopted as the average pore diameter. Here, as a measurement sample, a portion having a density of average density was used.

For the cristobalite content in opaque quartz glass, by means of an X-ray diffractometer (trade name "RINT UltimaIII", manufactured by Rigaku Corporation), the diffraction peak intensity ratio of amorphous silica and cristobalite crystals in a sample obtained by pulverizing opaque quartz glass, was measured, and from the intensity ratio, the cristobalite content was calculated.

The amounts of impurities such as metals and alkali, alkaline-earth elements contained in an opaque quartz glass were analyzed by using an ICP emission spectrophotometer (trade name "Vista-PRO", manufactured by Seiko Instruments Co., Ltd.).

Example 1

As a raw material powder, a synthetic amorphous silica powder having an average particle size of 6 μm was selected.

As a pore forming agent powder, a spherical graphite powder having an average particle size of 18 μm, an aspect ratio 1.5 and a concentration of Na, K, Ca, Cr, Fe and Ti of at most 0.1 ppm, was selected.

To the synthetic amorphous silica powder, the graphite powder was added, followed by mixing for 3 hours in a pot mill. The addition amount of the graphite powder was 0.16 by volume ratio to the amorphous silica powder.

The mixed powder was filled into a mold made of foamed styrol, the entire foamed styrol mold was vacuum-sealed in a polystyrene bag and subjected to CIP molding under conditions of a pressure of 200 MPa and a retention time of 1 minute.

A cylindrical molded body with a diameter of 170 mm and a thickness of 85 mm after the CIP molding, was calcined by a hearth elevating resistance heating electric furnace (Model "HPF-7020", manufactured by HIROCHIKU Co., Ltd.) in the air atmosphere, by raising the temperature from room temperature to 650° C. at a rate of 100° C./hr and from 650° C. to 800° C. at a rate of 50° C./hr, maintaining the temperature at 800° C. for 72 hours, then raising the temperature from 800° C. to the maximum calcination temperature of 1,425° C. at a rate of 50° C./hr, and maintaining the temperature at the maximum calcination temperature of 1,425° C. for 2 hours. The temperature was lowered to 50° C. at a rate of 100° C./hr, and then, the furnace was cooled to obtain an opaque quartz glass.

The density, water absorption, average pore diameter and transmittances at wavelengths of 2 μm and 4 μm of the opaque quartz glass obtained, are shown in Table 1.

In FIG. 1, the infrared spectrum of the opaque quartz glass is shown. According to this, the linear transmittance at a wavelength of from 1.5 μm to 5 μm, is at most 1%.

In Table 2, the concentrations of impurities contained in the opaque quartz glass are shown. The measured various alkali metal, alkaline earth metal, metal element concentrations were at most 1 ppm.

In Table 3, the cristobalite content in the opaque quartz glass sintered body and the presence or absence of cracks are shown. In the opaque quartz glass sintered body, no cristobalite was formed, and no cracks were formed.

Example 2

The same raw material powder and pore forming agent as in Example 1 were selected, and in the same manner as in Example 1, a cylindrical molded body having a diameter of 170 mm and a thickness of 85 mm was obtained.

The obtained molded body was subjected to calcination under the same calcination conditions as in Example 1 except that it was maintained at the maximum calcination temperature of 1,425° C. for 4 hours, to obtain opaque quartz glass.

The density, water absorption, average pore diameter and transmittances at wavelengths of 2 μm and 4 μm, of the opaque quartz glass obtained, are shown in Table 1.

Figure 2:
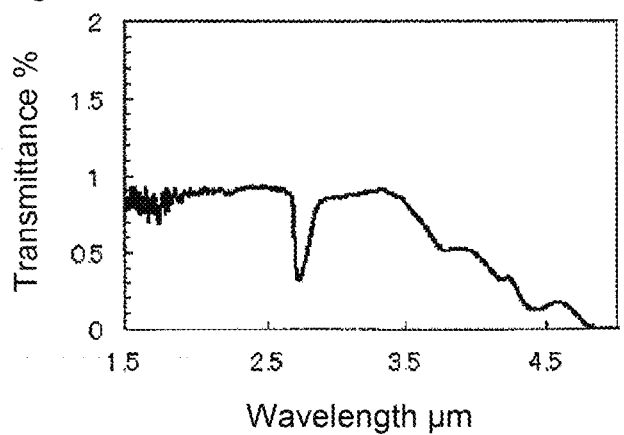
FIG. 2 is an infrared spectrum of the opaque quartz glass produced in Example 2.

The infrared spectrum of the opaque quartz glass is shown in FIG. 2. According to this, the linear transmittance at a wavelength of from 1.5 μm to 5 μm, is at most 1%.

Figure 25:
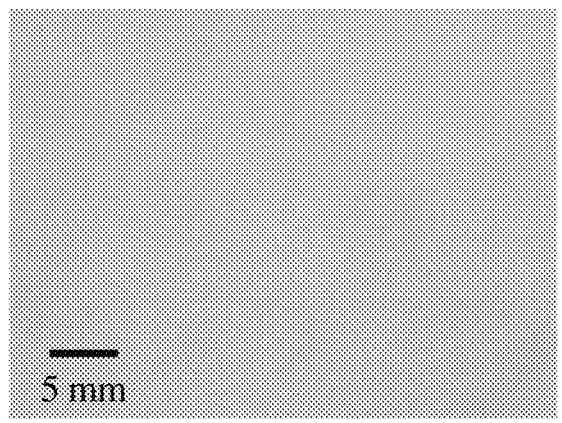
FIG. 25 is a photograph of a part of a cross section of the opaque quartz glass produced in Example 2.

A part of a cross section of the opaque quartz glass obtained, is shown in FIG. 25. According to this, no cracks are formed in the opaque quartz glass.

In Table 3, the cristobalite content in the opaque quartz glass sintered body and the presence or absence of cracks, are shown. In the opaque quartz glass sintered body, no cristobalite is formed, and no crack is formed.

In Table 4, the density and variation coefficient, and the water absorption, of the opaque quartz glass, are shown. In the opaque quartz glass which is prepared by adding a pore forming agent, pores are uniformly dispersed, and the coefficient of variation of density is at most 0.02.

Figure 22:
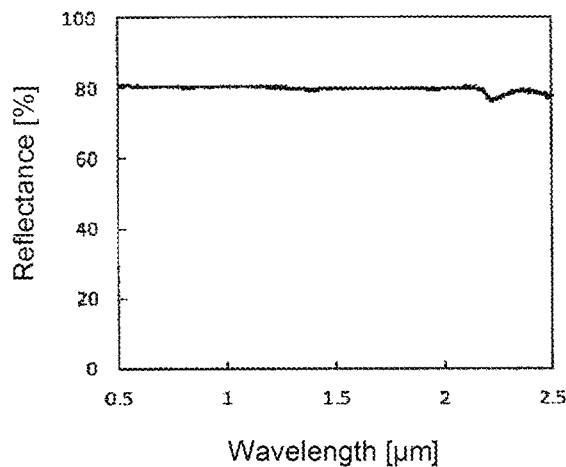
FIG. 22 is a diffuse reflectance spectrum of the opaque quartz glass produced in Example 2.

In FIG. 22, the diffuse reflection spectrum of the opaque quartz glass is shown. According to this, the diffuse reflectance at a wavelength of 2 μm is at least 70%.

Example 3

The same raw material powder and pore forming agent as in Example 1 were selected, and in the same manner as in Example 1, a semi-cylindrical molded body having a diameter of 60 mm and a thickness of 20 mm was obtained.

The obtained molded body was calcined by a SiC heating element electric furnace (Model "BTEXSH-1460G", manufactured by Siliconit Konetsu Kogyo Co., Ltd.) in the air atmosphere by raising the temperature from room temperature to 700° C. at a rate of 5° C./min, and from 700° C. to the maximum calcination temperature of 1,450° C. at a rate of 1° C./min, and maintaining the temperature at the maximum calcination temperature of 1,450° C. for 6 hours. The temperature was lowered to 1,000° C. at a rate of 5° C./min, and then, the furnace was cooled to obtain opaque quartz glass.

The density, water absorption, average pore diameter and transmittances at wavelengths of 2 μm and 4 μm, of the opaque quartz glass obtained, are shown in Table 1.

Figure 3:
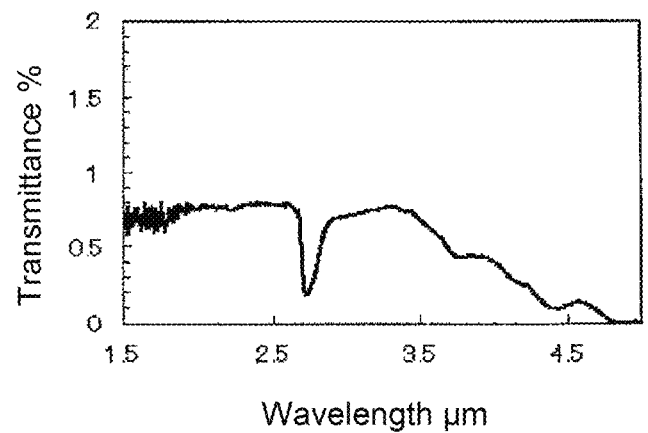
FIG. 3 is an infrared spectrum of the opaque quartz glass produced in Example 3.

The infrared spectrum of the opaque quartz glass is shown in FIG. 3. According to this, the linear transmittance at a wavelength of from 1.5 μm to 5 μm, is at most 1%.

In Table 3, the cristobalite content in the opaque quartz glass sintered body and the presence or absence of cracks, are shown. In the opaque quartz glass sintered body, no cristobalite is formed, and no crack is formed.

Example 4

The same raw material powder and pore forming agent as in Example 1 were selected, and in the same manner as in Example 1, a semi-cylindrical molded body having a diameter of 60 mm and a thickness of 20 mm was obtained.

The obtained molded body was subjected to calcination under the same calcination conditions as in Example 3 except that it was maintained at the maximum calcination temperature of 1,450° C. for 10 hours, to obtain opaque quartz glass.

The density, water absorption, average pore diameter and transmittances at wavelengths of 2 μm and 4 μm, of the opaque quartz glass obtained, are shown in Table 1.

Figure 4:
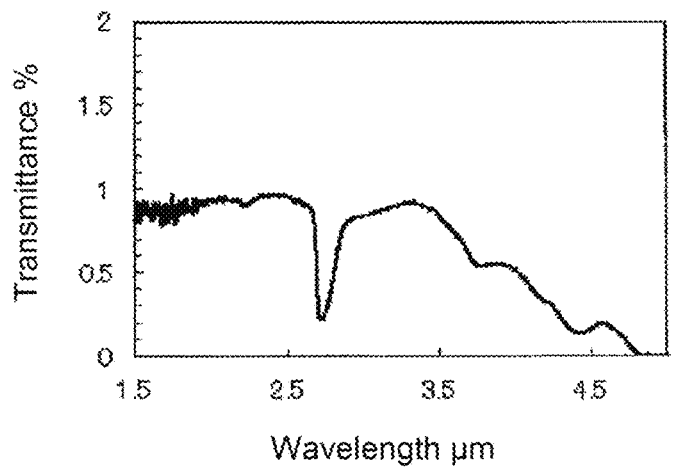
FIG. 4 is an infrared spectrum of the opaque quartz glass produced in Example 4.

In FIG. 4, the infrared spectrum of the opaque quartz glass is shown. According to this, the linear transmittance at a wavelength of from 1.5 μm to 5 μm, is at most 1%.

In Table 3, the cristobalite content in the opaque quartz glass sintered body and the presence or absence of cracks, are shown. In the opaque quartz glass sintered body, no cristobalite is formed, and no crack is formed.

Example 5

The same raw material powder and pore forming agent as in Example 1 were selected, and in the same manner as in Example 1 except that the addition amount of the graphite powder was changed to 0.22 by volume ratio to the amorphous silica powder, a cylindrical molded body having a diameter of 170 mm and a thickness of 85 mm was obtained.

The obtained molded body was subjected to calcination under the same calcination conditions as in Example 1 except that it was maintained at the maximum calcination temperature of 1,425° C. for 4 hours to obtain opaque quartz glass having a diameter of 145 mm and a thickness of 75 mm.

The density, water absorption and transmittances at wavelengths of 2 μm and 4 μm, of the opaque quartz glass obtained, are shown in Table 1.

Figure 5:
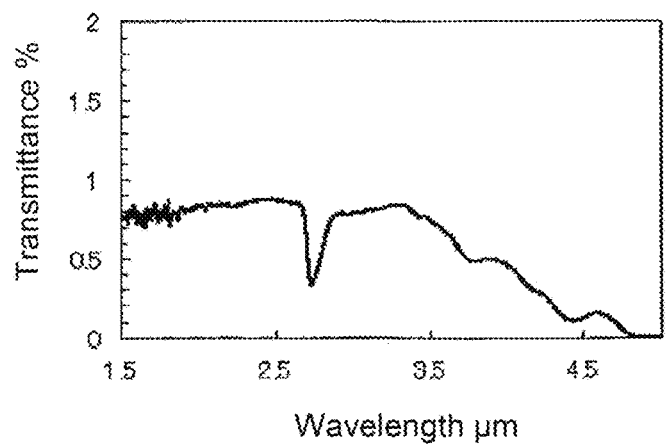
FIG. 5 is an infrared spectrum of the opaque quartz glass produced in Example 5.

In FIG. 5, the infrared spectrum of the opaque quartz glass is shown. According to this, the linear transmittance at a wavelength of from 1.5 μm to 5 μm, is at most 1%.

Example 6

The same raw material powder and pore forming agent as in Example 5 were selected, and in the same manner as in Example 5, a cylindrical molded body having a diameter of 170 mm and a thickness of 85 mm was obtained.

The obtained molded body was subjected to calcination under the same calcination conditions as in Example 5 except that it was maintained at the maximum calcination temperature of 1,425° C. for 6 hours, to obtain opaque quartz glass having a diameter of 145 mm and a thickness of 75 mm.

The density, water absorption, average pore diameter and transmittances at wavelengths of 2 μm and 4 μm, of the opaque quartz glass obtained, are shown in Table 1.

Figure 6:
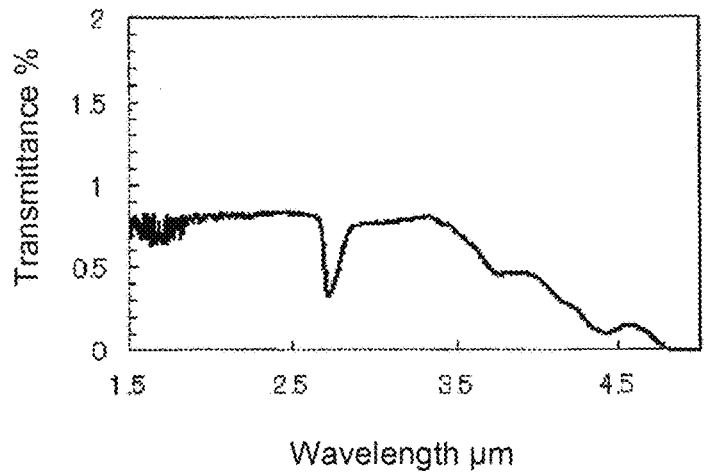
FIG. 6 is an infrared spectrum of the opaque quartz glass produced in Example 6.

In FIG. 6, the infrared spectrum of the opaque quartz glass is shown. According to this, the linear transmittance at a wavelength of from 1.5 μm to 5 μm is at most 1%.

In Table 3, the cristobalite content in the opaque quartz glass sintered body and the presence or absence of cracks, are shown. In the opaque quartz glass sintered body, the cristobalite content is low, and no crack is formed.

In Table 4, the density and variation coefficient, and the water absorption, of the opaque quartz glass are shown. In the opaque quartz glass prepared by adding a pore forming agent, pores are uniformly dispersed, and the coefficient of variation of density is at most 0.02.

Example 7

The same raw material powder and pore forming agent as in Example 5 were selected, and in the same manner as in Example 5, a cylindrical molded body having a diameter of 170 mm and a thickness of 85 mm was obtained.

The obtained molded body was subjected to calcination under the same calcination conditions as in Example 5 except that it was maintained at the maximum calcination temperature of 1,425° C. for 8 hours to obtain opaque quartz glass having a diameter of 145 mm and a thickness of 75 mm.

The density, water absorption and transmittances at wavelengths of 2 μm and 4 μm, of the opaque quartz glass obtained, are shown in Table 1.

Figure 7:
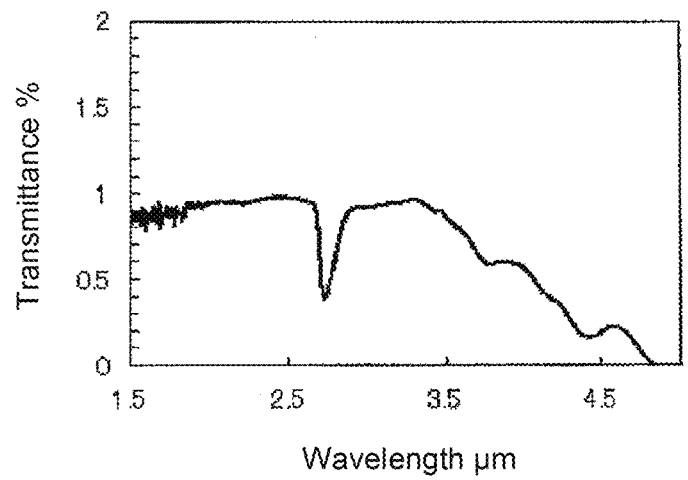
FIG. 7 is an infrared spectrum of the opaque quartz glass produced in Example 7.

In FIG. 7, the infrared spectrum of the opaque quartz glass is shown. According to this, the linear transmittance at a wavelength of from 1.5 μm to 5 μm is at most 1%.

Example 8

The same raw material powder as in Example 1 was selected, and as a pore forming agent, a spherical amorphous carbon powder having an average particle size of 15 μm, an aspect ratio 1.0 and concentrations of Ca, Cr, Fe and Ti of 6.5, 85, 150 and 1.3 ppm, respectively, was selected.

To the synthetic amorphous silica powder, the amorphous carbon powder was added, followed by mixing for 3 hours in a pot mill. The addition amount of the amorphous carbon powder was 0.16 as volume ratio to the amorphous silica powder.

The mixed powder was molded by CIP in the same manner as in Example 1 to obtain a cylindrical molded body having a diameter of 170 mm and a thickness of 85 mm.

The obtained molded body was calcined by a hearth elevating resistance heating electric furnace (Model "HPF-7020", manufactured by HIROCHIKU Co., Ltd.) in the air atmosphere by raising the temperature from room temperature to 650° C. at a rate of 100° C./hr, and from 650° C. to 800° C. at a rate of 50° C./hr, maintaining the temperature at 800° C. for 72 hours, and then raising the temperature from 800° C. to the maximum calcination temperature of 1,425° C. at a rate of 50° C./hr, and maintaining the temperature at the maximum calcination temperature of 1,425° C. for 6 hours. The temperature was lowered to 50° C. at a rate of 100° C./hr, and then, the furnace was cooled, to obtain opaque quartz glass.

The density, water absorption, average pore diameter and transmittances at wavelengths of 2 μm and 4 μm, of the opaque quartz glass obtained, are shown in Table 1.

Figure 8:
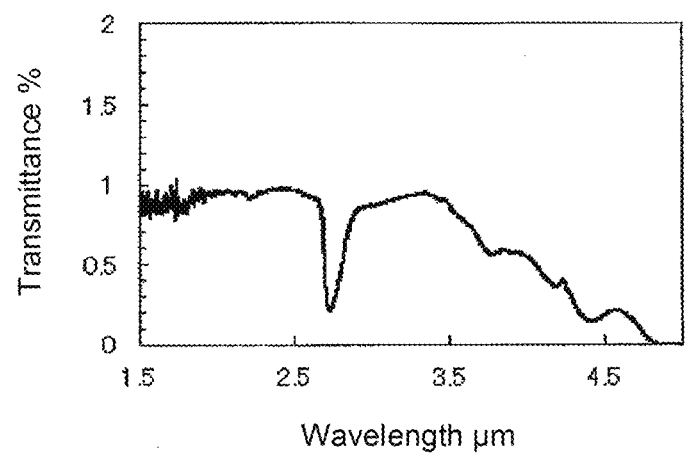
FIG. 8 is an infrared spectrum of the opaque quartz glass produced in Example 8.

In FIG. 8, the infrared spectrum of the opaque quartz glass is shown. According to this, the linear transmittance at a wavelength of from 1.5 μm to 5 μm, is at most 1%.

In Table 2, concentrations of impurities contained in the opaque quartz glass are shown. Among the measured various alkali metal, alkaline earth metal and metal element concentrations, Fe was at least 10 ppm.

Figure 26:
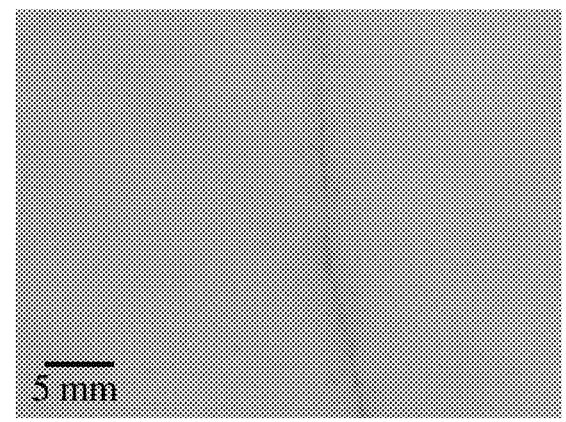
FIG. 26 is a photograph of a part of a cross section of the opaque quartz glass produced in Example 8.

A part of a cross section of the opaque quartz glass obtained, is shown in FIG. 26. According to this, cracks are formed in the opaque quartz glass.

In Table 3, the cristobalite content in the opaque quartz glass sintered body and the presence or absence of cracks are shown. The cristobalite content in the opaque quartz glass sintered body is at least 2%, whereby it is considered that cracks are formed.

In Table 4, the density and variation coefficient, and the water absorption, of the opaque quartz glass, are shown. In the opaque quartz glass prepared by adding a pore forming agent, pores are uniformly dispersed, and the coefficient of variation of density is at most 0.02.

Example 9

The same raw material powder and pore forming agent as in Example 8 were selected, and in the same manner as in Example 8, a cylindrical molded body having a diameter of 170 mm and a thickness of 85 mm was obtained.

The obtained molded body was calcined by a hearth elevating resistance heating electric furnace (Model "HPF-7020", manufactured by HIROCHIKU Co., Ltd.) in the air atmosphere by raising the temperature from room temperature to 650° C. at a rate of 100° C./hr, and from 650° C. to 1,000° C. at a rate of 50° C./hr, maintaining the temperature at 1,000° C. for 24 hours, and then raising the temperature from 1,000° C. to the maximum calcination temperature of 1,425° C. at a rate of 50° C./hr, and maintaining the temperature at the maximum calcination temperature of 1,425° C. for 6 hours. The temperature was lowered to 50°

C. at a rate of 100° C./hr, and then, the furnace was cooled, to obtain opaque quartz glass having a diameter of 145 mm and a thickness of 75 mm.

The density, water absorption, average pore diameter and transmittances at wavelengths of 2 μm and 4 μm, of the opaque quartz glass obtained, are shown in Table 1.

Figure 9:
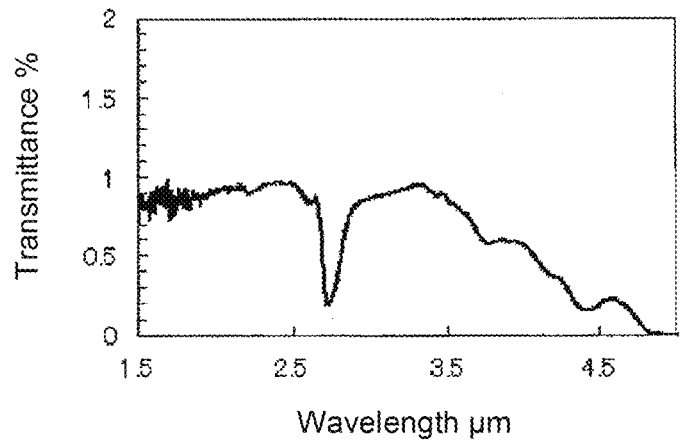
FIG. 9 is an infrared spectrum of the opaque quartz glass produced in Example 9.

In FIG. 9, the infrared spectrum of the opaque quartz glass is shown. According to this, the linear transmittance at a wavelength of from 1.5 μm to 5 μm, is at most 1%.

Figure 27:
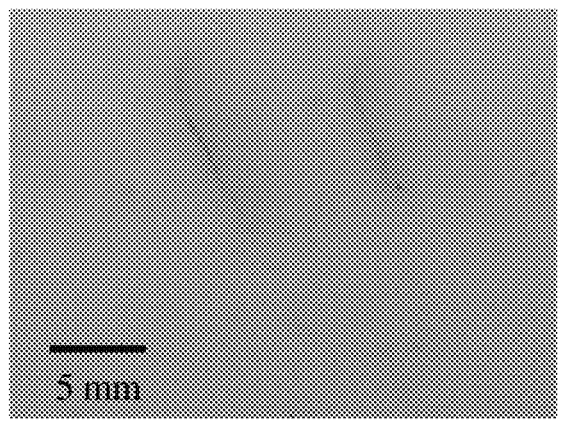
FIG. 27 is a photograph of a part of a cross section of the opaque quartz glass produced in Example 9.

A part of a cross section of the opaque quartz glass obtained, is shown in FIG. 27. According to this, cracks are formed in the opaque quartz glass.

In Table 3, the cristobalite content in the opaque quartz glass sintered body and the presence or absence of cracks, are shown. The cristobalite content in the opaque quartz glass sintered body is at least 2%, whereby it is considered that cracks are formed.

In Table 4, the density and variation coefficient, and the water absorption, of the opaque quartz glass, are shown. In the opaque quartz glass prepared by adding a pore forming agent, pores are uniformly dispersed and the coefficient of variation of density is at most 0.02.

Example 10

The same raw material powder and pore forming agent as in Example 8 were selected and mixed by a rocking mixer for 3 hours. The addition amount of the amorphous carbon powder was 0.16 by volume ratio to the amorphous silica powder.

The mixed powder was molded by CIP in the same manner as in Example 1.

A semi-cylindrical molded body having a diameter of 60 mm and a thickness of 20 mm after the CIP molding, was calcined by a SiC heating element electric furnace (Model "BTEXSH-1460G", manufactured by Siliconit Konetsu Kogyo Co., Ltd.) in the air atmosphere, by raising the temperature from room temperature to 650° C. at a rate of 5° C./min, from 650° C. to 850° C. at a rate of 1° C./min, and from 850° C. to the maximum calcination temperature of 1,425° C. at a rate of 5° C./min, and maintaining the temperature at the maximum calcination temperature of 1,425° C. for 8 hours. The temperature was lowered to 1,000° C. at a rate of 5° C./min, and then, the furnace was cooled, to obtain opaque quartz glass.

The density, water absorption, average pore diameter and transmittances at wavelengths of 2 μm and 4 μm, of the opaque quartz glass obtained, are shown in Table 1.

Figure 10:
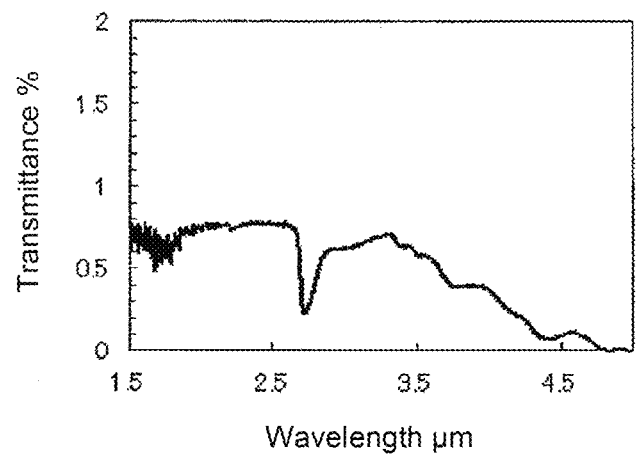
FIG. 10 is an infrared spectrum of the opaque quartz glass produced in Example 10.

In FIG. 10, the infrared spectrum of the opaque quartz glass is shown. According to this, the linear transmittance at a wavelength of from 1.5 μm to 5 μm, is at most 1%.

Example 11

The same raw material powder and pore forming agent as in Example 10 were selected, and in the same manner as in Example 10, a semi-cylindrical molded body having a diameter of 60 mm and a thickness of 20 mm was obtained.

The obtained molded body was calcined under the same calcination conditions as in Example 10 except that it was maintained at the maximum calcination temperature of 1,450° C. for 6 hours, to obtain opaque quartz glass.

The density, water absorption, average pore diameter and transmittances at wavelengths of 2 μm and 4 μm, of the opaque quartz glass obtained, are shown in Table 1.

Figure 11:
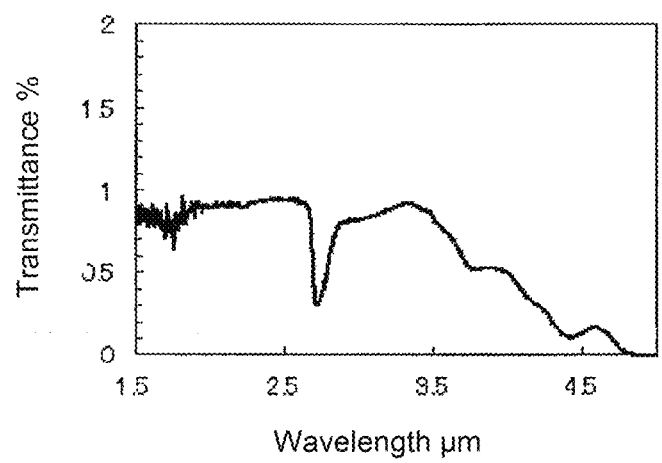
FIG. 11 is an infrared spectrum of the opaque quartz glass produced in Example 11.

In FIG. 11, the infrared spectrum of the opaque quartz glass is shown. According to this, the linear transmittance at a wavelength of from 1.5 μm to 5 μm, is at most 1%.

Example 12

The same raw material powder and pore forming agent as in Example 10 were selected, and in the same manner as in Example 10, a semi-cylindrical molded body having a diameter of 60 mm and a thickness of 20 mm was obtained.

The obtained molded body was calcined under the same calcination conditions as in Example 10 except that it was maintained at the maximum calcination temperature of 1,450° C. for 10 hours, to obtain opaque quartz glass.

The density, water absorption, average pore diameter and transmittances at wavelengths of 2 μm and 4 μm, of the opaque quartz glass obtained, are shown in Table 1.

Figure 12:
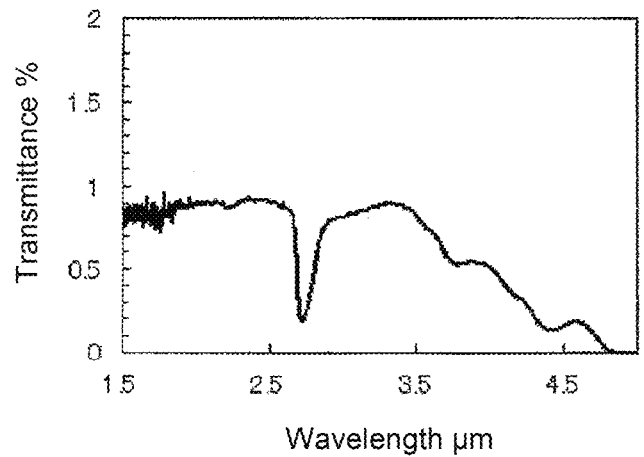
FIG. 12 is an infrared spectrum of the opaque quartz glass produced in Example 12.

In FIG. 12, the infrared spectrum of the opaque quartz glass is shown. According to this, the linear transmittance at a wavelength of from 1.5 μm to 5 μm, is at most 1%.

Example 13

By selecting the same raw material powder and pore forming agent as in Example 10, a semi-cylindrical shaped body having a diameter of 60 mm and a thickness of 20 mm was obtained in the same manner as in Example 10 except that the addition amount of the amorphous carbon powder was changed to 0.13 by volume ratio to the amorphous silica powder.

The obtained molded body was calcined under the same calcination conditions as in Example 10 except that it was maintained at the maximum calcination temperature of 1,450° C. for 8 hours, to obtain opaque quartz glass.

The density, water absorption, average pore diameter and transmittances at wavelengths of 2 μm and 4 μm, of the opaque quartz glass obtained, are shown in Table 1.

Figure 13:
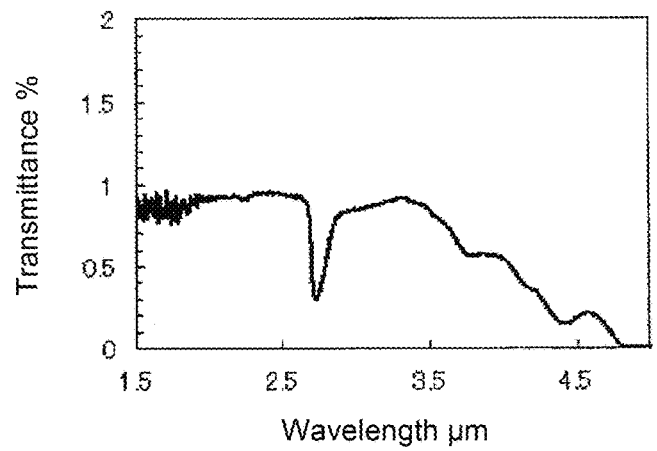
FIG. 13 is an infrared spectrum of the opaque quartz glass produced in Example 13.

In FIG. 13, the infrared spectrum of the opaque quartz glass is shown. According to this, the linear transmittance at a wavelength of from 1.5 μm to 5 μm, is at most 1%.

Comparative Example 1

Only the same raw material powder as in Example 1 was molded by CIP in the same manner as in Example 1 to obtain a cylindrical molded body having a diameter of 60 mm and a thickness of 20 mm.

The obtained molded body was calcined in a resistance heating vacuum pressurized pressure sintering furnace (Model "FVPS-R-150/200", manufactured by Fujidempa Kogyo. Co., Ltd.) in under a 1 atm nitrogen atmosphere by raising the temperature from room temperature to 1,000° C. at a rate of 5° C./min, and from 1,000° C. to the maximum calcination temperature of 1,350° C. at a rate of 1° C./min, and maintaining the temperature at the maximum calcination temperature of 1,350° C. for 10 hours. Thereafter, the temperature was lowered to 1,000° C. at a rate of 5° C./min, and then the furnace was cooled to obtain opaque quartz glass.

The density, water absorption and transmittances at wavelengths of 2 μm and 4 μm, of the opaque quartz glass obtained, are shown in Table 1.

Figure 14:
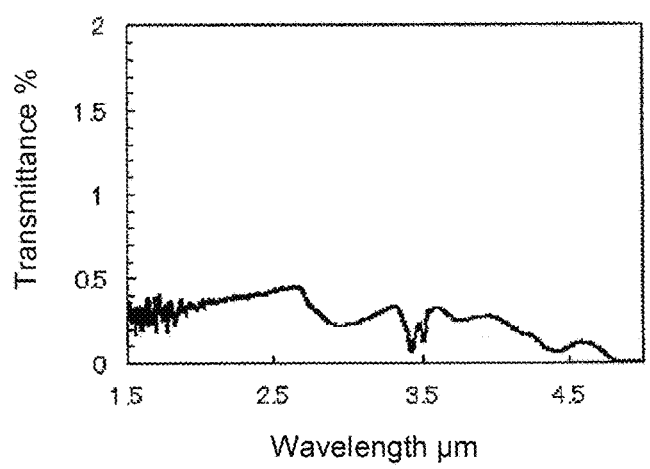
FIG. 14 is an infrared spectrum of the opaque quartz glass produced in Comparative Example 1.

In FIG. 14, the infrared spectrum of the opaque quartz glass is shown. According to this, the linear transmittance at a wavelength of from 1.5 μm to 5 μm, is at most 1%, but since sintering is insufficient, the water absorption is higher than 0.1 wt %.

Comparative Example 2

The same raw material powder as in Comparative Example 1 was selected, and in the same manner as in Comparative Example 1, a cylindrical molded body having a diameter of 60 mm and a thickness of 20 mm was obtained.

The obtained molded body was calcined under the same calcination conditions as in Comparative Example 1 except that it was maintained at the maximum calcination temperature of 1,350° C. for 15 hours, to obtain opaque quartz glass.

The density, water absorption, average pore diameter and transmittances at wavelengths of 2 μm and 4 μm, of the opaque quartz glass obtained, are shown in Table 1.

Figure 15:
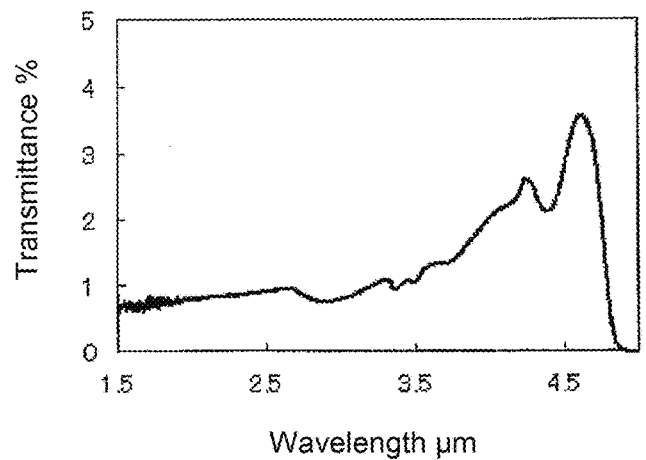
FIG. 15 is an infrared spectrum of the opaque quartz glass produced in Comparative Example 2.

In FIG. 15, the infrared spectrum of the opaque quartz glass is shown. According to this, the linear transmittance at a wavelength of from 3 μm to 5 μm in a range of from 1.5 μm to 5 μm is larger than 1%. Since the average pore diameter was small, the transmittance of infrared light with a long wavelength was high.

Comparative Example 3

The same raw material powder as in Comparative Example 1 was selected, and in the same manner as in Comparative Example 1, a cylindrical molded body having a diameter of 60 mm and a thickness of 20 mm was obtained.

The obtained molded body was calcined under the same calcination conditions as in Comparative Example 1 except that it was maintained at the maximum calcination temperature of 1,400° C. for 3 hours, to obtain opaque quartz glass.

The density, water absorption, average pore diameter and transmittances at wavelengths of 2 μm and 4 μm, of the opaque quartz glass obtained, are shown in Table 1.

Figure 16:
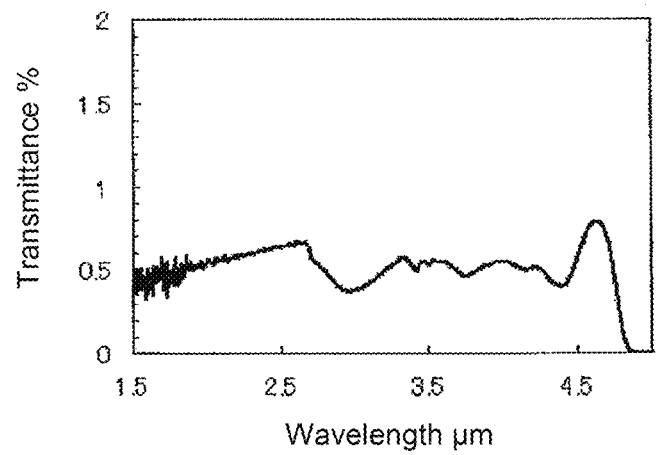
FIG. 16 is an infrared spectrum of the opaque quartz glass produced in Comparative Example 3.

In FIG. 16, the infrared spectrum of the opaque quartz glass is shown. According to this, the linear transmittance at a wavelength of from 1.5 μm to 5 μm is at most 1%, but since sintering is insufficient, the water absorption is higher than 0.1 wt %.

Comparative Example 4

The same raw material powder as in Comparative Example 1 was selected, and in the same manner as in Comparative Example 1, a cylindrical molded body having a diameter of 60 mm and a thickness of 20 mm was obtained.

The obtained molded body was calcined under the same calcination conditions as in Comparative Example 1 except that it was maintained at the maximum calcination temperature of 1,400° C. for 4 hours, to obtain opaque quartz glass.

The density, water absorption, average pore diameter and transmittances at wavelengths of 2 μm and 4 μm, of the opaque quartz glass obtained, are shown in Table 1.

Figure 17:
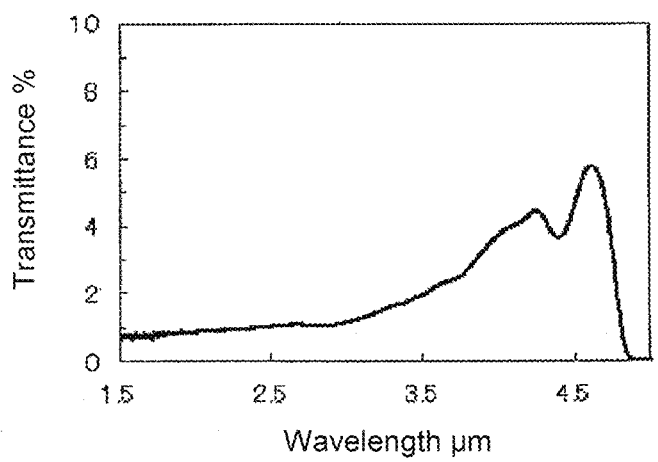
FIG. 17 is an infrared spectrum of the opaque quartz glass produced in Comparative Example 4.

In FIG. 17, the infrared spectrum of the opaque quartz glass is shown. According to this, the linear transmittance at a wavelength of from 2.5 μm to 5 μm in a range of from 1.5 μm to 5 μm is larger than 1%. Since the average pore diameter was small, the transmittance of infrared light with a long wavelength was high.

Comparative Example 5

Only the same raw material powder as in Example 1 was molded by CIP in the same manner as in Example 1 to obtain a cylindrical molded body having a diameter of 170 mm and a thickness of 85 mm.

The obtained molded body was calcined under the same calcination conditions as in Example 9 to obtain opaque quartz glass having a diameter of 145 mm and a thickness of 75 mm.

The density, water absorption, average pore diameter and transmittances at wavelengths of 2 μm and 4 μm, of the opaque quartz glass obtained, are shown in Table 1.

Figure 18:
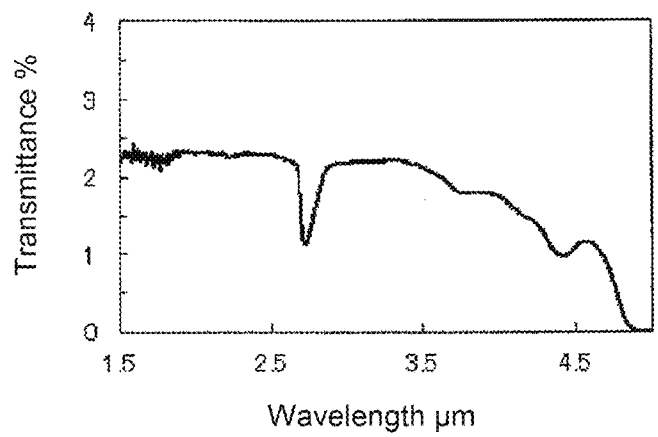
FIG. 18 is an infrared spectrum of the opaque quartz glass produced in Comparative Example 5.

In FIG. 18, the infrared spectrum of the opaque quartz glass is shown. According to this, the linear transmittance at a wavelength of from 3 μm to 5 μm in a range of from 1.5 μm to 5 μm is larger than 1%. Since the average pore diameter was small, the transmittance of infrared light with a long wavelength was high.

In Table 3, the presence or absence of cracks in the opaque quartz glass sintered body is shown. No cracks were observed in the opaque quartz glass sintered body.

In Table 4, the density and variation coefficient, and the water absorption, of the opaque quartz glass, are shown. In the opaque quartz glass prepared without addition of a pore forming agent had a large density distribution in the sintered body, and the coefficient of variation of density was at least 0.02.

Comparative Example 6

By selecting the same raw material powder and pore forming agent as in Example 10, a semi-cylindrical shaped body having a diameter of 60 mm and a thickness of 20 mm was obtained in the same manner as in Example 10 except that the addition amount of the amorphous carbon powder was changed to 0.02 by volume ratio to the amorphous silica powder.

The obtained molded body was calcined under the same calcination conditions as in Example 10 except that it was maintained at the maximum calcination temperature of 1,450° C. for 6 hours, to obtain opaque quartz glass.

The density, water absorption, average pore diameter and transmittances at wavelengths of 2 μm and 4 μm, of the opaque quartz glass obtained, are shown in Table 1.

Figure 19:
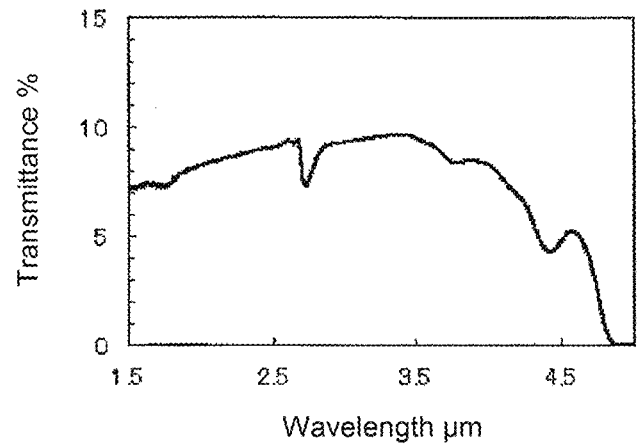
FIG. 19 is an infrared spectrum of the opaque quartz glass produced in Comparative Example 6.

In FIG. 19, the infrared spectrum of the opaque quartz glass is shown. According to this, the linear transmittance at a wavelength of from 1.5 μm to 5 μm, is higher than 1%. The transmittance was high, since the amount of the pore forming agent added was small.

In Table 3, the cristobalite content in the opaque quartz glass sintered body and the presence or absence of cracks, are shown. The opaque cristobalite content in the quartz glass sintered body is low, and no crack is formed.

Comparative Example 7

To a quartz crystal powder, 0.2 wt % of a silicon nitride powder having a particle size of from 1 to 10 μm was mixed, followed by melting by the oxyhydrogen flame fusion method to obtain opaque quartz glass.

The density, water absorption, average pore diameter and transmittances at wavelengths of 2 μm and 4 μm, of the opaque quartz glass obtained, are shown in Table 1.

Figure 20:
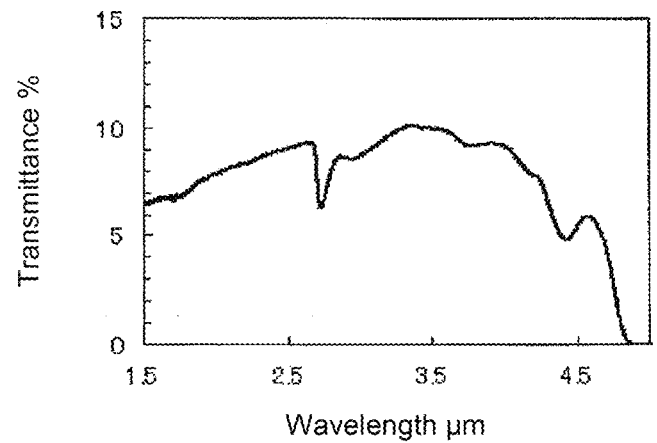
FIG. 20 is an infrared spectrum of the opaque quartz glass produced in Comparative Example 7.

In FIG. 20, the infrared spectrum of the opaque quartz glass is shown. According to this, the linear transmittance at a wavelength of from 1.5 μm to 5 μm, is higher than 1%. The transmittance was high, since the average pore diameter was large.

Figure 23:
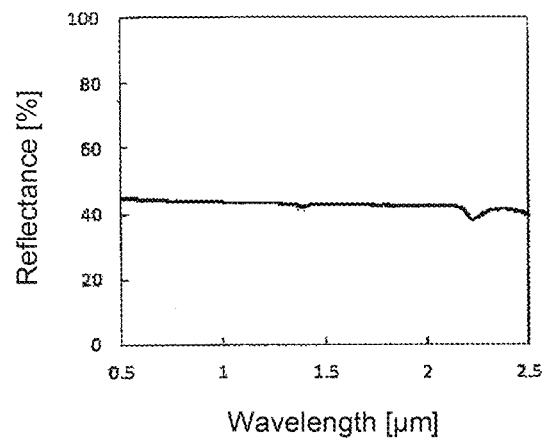
FIG. 23 is a diffuse reflectance spectrum of the opaque quartz glass produced in Comparative Example 7.

In FIG. 23, the diffuse reflection spectrum of the opaque quartz glass is shown. According to this, the diffuse reflectance at a wavelength of 2 μm is less than 70%.

Comparative Example 8

The density, water absorption, average pore diameter and transmittances at a wavelength of 2 μm and 4 μm, of a commercially available opaque quartz OM100 (manufactured by Heraeus Quartzglas), are shown in Table 1.

Figure 21:
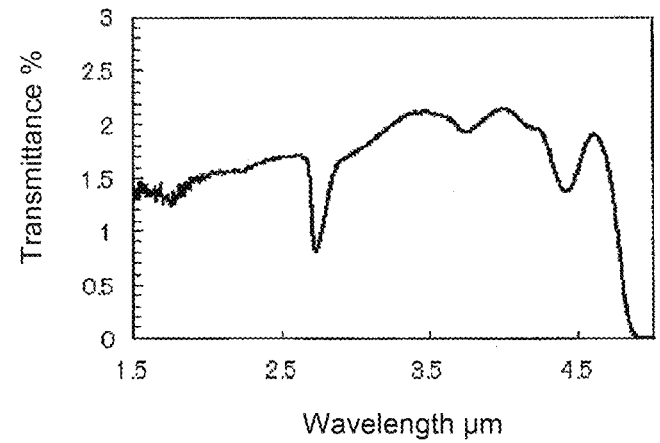
FIG. 21 is an infrared spectrum of the opaque quartz glass in Comparative Example 8.

In FIG. 21, the infrared spectrum of the opaque quartz glass is shown. According to this, the linear transmittance at a wavelength of from 3 μm to 5 μm in a range of from 1.5 μm to 5 μm, is higher than 1%. The transmittance of infrared light having a long wavelength was high, since the average pore diameter was small.

Figure 24:
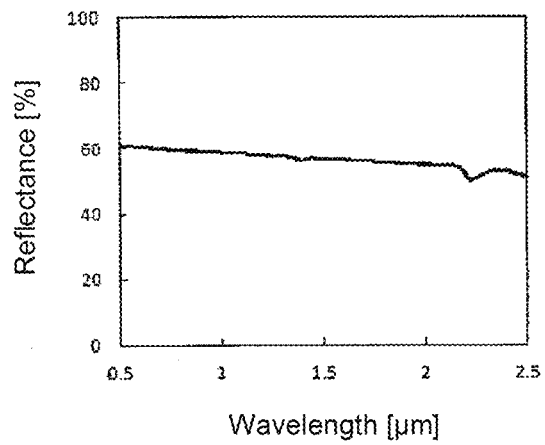
FIG. 24 is a diffuse reflectance spectrum of the opaque quartz glass in Comparative Example 8.

In FIG. 24, the diffuse reflection spectrum of the opaque quartz glass is shown. According to this, the diffuse reflectance at a wavelength of 2 μm is less than 70%.

TABLE 1

| | Pore forming agent | | | Calcination process | | | Physical property of glass | | | Transmittance (%) | |
|---|---|---|---|---|---|---|---|---|---|---|---|
| Type | Average particle size (μm) | Aspect ratio | Addition amount (volume ratio) | Pore forming agent burning off temp. (° C.) | Calcination temp. (° C.) | Retention time (hr) | Density (g/cm³) | Average pore diameter (μm) | Water absorption (%) | Wavelength 2 μm | Wavelength 4 μm |
| Ex. 1 | Spherical graphite powder | 18 | 1.5 | 0.16 | 800 | 1,425 | 2 | 1.97 | 11.78 | <0.1 | 0.73 | 0.41 |
| Ex. 2 | Spherical graphite powder | 18 | 1.5 | 0.16 | 800 | 1,425 | 4 | 2.05 | 11.32 | <0.1 | 0.91 | 0.49 |
| Ex. 3 | Spherical graphite powder | 18 | 1.5 | 0.16 | 700 | 1,450 | 6 | 2.03 | 11.07 | <0.1 | 0.76 | 0.41 |
| Ex. 4 | Spherical graphite powder | 18 | 1.5 | 0.16 | 700 | 1,450 | 10 | 2.06 | 11.57 | <0.1 | 0.92 | 0.52 |
| Ex. 5 | Spherical graphite powder | 18 | 1.5 | 0.22 | 800 | 1,425 | 4 | 1.98 | — | <0.1 | 0.83 | 0.46 |
| Ex. 6 | Spherical graphite powder | 18 | 1.5 | 0.22 | 800 | 1,425 | 6 | 2.02 | 11.88 | <0.1 | 0.83 | 0.43 |
| Ex. 7 | Spherical graphite powder | 18 | 1.5 | 0.22 | 800 | 1,425 | 8 | 2.01 | — | <0.1 | 0.93 | 0.57 |
| Ex. 8 | Spherical amorphous carbon powder | 15 | 1.0 | 0.16 | 800 | 1,425 | 6 | 2.02 | 13.55 | <0.1 | 0.93 | 0.54 |
| Ex. 9 | Spherical amorphous carbon powder | 15 | 1.0 | 0.16 | 1,000 | 1,425 | 6 | 2.03 | 11.94 | <0.1 | 0.95 | 0.57 |
| Ex. 10 | Spherical amorphous carbon powder | 15 | 1.0 | 0.16 | 650 | 1,425 | 8 | 2.01 | 10.81 | <0.1 | 0.77 | 0.37 |
| Ex. 11 | Spherical amorphous carbon powder | 15 | 1.0 | 0.16 | 650 | 1,450 | 6 | 2.04 | 11.43 | <0.1 | 0.90 | 0.49 |
| Ex. 12 | Spherical amorphous carbon powder | 15 | 1.0 | 0.16 | 650 | 1,450 | 10 | 2.06 | 10.01 | <0.1 | 0.92 | 0.50 |
| Ex. 13 | Spherical amorphous carbon powder | 15 | 1.0 | 0.13 | 650 | 1,450 | 8 | 2.08 | 11.13 | <0.1 | 0.93 | 0.54 |
| Comp. Ex. 1 | — | — | — | — | — | 1,350 | 10 | 2.04 | — | 1.91 | 0.31 | 0.28 |
| Comp. Ex. 2 | — | — | — | — | — | 1,350 | 15 | 2.14 | 2.34 | <0.1 | 0.83 | 2.04 |
| Comp. Ex. 3 | — | — | — | — | — | 1,400 | 3 | 2.12 | — | 0.25 | 0.52 | 0.56 |
| Comp. Ex. 4 | — | — | — | — | — | 1,400 | 4 | 2.17 | 1.84 | <0.1 | 0.86 | 3.76 |
| Comp. Ex. 5 | — | — | — | — | 1,000 | 1,425 | 6 | 2.12 | 7.72 | <0.1 | 2.31 | 1.75 |
| Comp. Ex. 6 | Spherical amorphous carbon powder | 15 | 1.0 | 0.02 | 650 | 1,450 | 6 | 2.17 | 11.69 | <0.1 | 8.25 | 8.32 |

TABLE 1-continued

| | Production conditions | | | | | | Physical property of glass | | | Transmittance (%) | |
| | Pore forming agent | | | Calcination process | | | | | | | |
| Type | Average particle size (μm) | Aspect ratio | Addition amount (volume ratio) | Pore forming agent burning off temp. (° C.) | Calcination temp. (° C.) | Retention time (hr) | Density (g/cm³) | Average pore diameter (μm) | Water absorption (%) | Wavelength 2 μm | Wavelength 4 μm |
|---|---|---|---|---|---|---|---|---|---|---|---|
| Comp. Ex. 7 | — | — | — | — | — | — | 2.05 | 49.86 | <0.1 | 7.86 | 9.17 |
| Comp. Ex. 8 | — | — | — | — | — | — | 2.19 | 2.77 | <0.1 | 1.53 | 2.15 |

TABLE 2

Concentrations of impurity components (ppm)

| | Na | Mg | Al | K | Ca | Cr | Fe | Cu | Zn |
|---|---|---|---|---|---|---|---|---|---|
| Ex. 1 | 0.02 | 0.15 | 0.07 | 0.02 | 0.06 | 0.07 | 0.33 | <0.01 | 0.04 |
| Ex. 8 | 0.02 | 0.16 | 0.18 | 0.04 | 0.95 | 6.20 | 15.00 | — | 0.02 |

TABLE 3

| | Mixed powder purity (ppm) | | | | Molded body size (mm) (diameter × thickness) | Pore forming agent burning off temp. (° C.) | Cristobalite content (%) | Cracks in sintered body |
| | Ca | Cr | Fe | Ti | | | | |
|---|---|---|---|---|---|---|---|---|
| Ex. 1 | <0.1 | <0.1 | <0.1 | <0.1 | Φ170 × 85 t | 800 | 0.0 | Absent |
| Ex. 2 | <0.1 | <0.1 | <0.1 | <0.1 | Φ170 × 85 t | 800 | 0.0 | Absent |
| Ex. 3 | <0.1 | <0.1 | <0.1 | <0.1 | Φ60 × 20 t (semi-cylindrical) | 700 | 0.0 | Absent |
| Ex. 4 | <0.1 | <0.1 | <0.1 | <0.1 | Φ60 × 20 t (semi-cylindrical) | 700 | 0.0 | Absent |
| Comp. Ex. 5 | — | — | — | — | Φ170 × 85 t | 1,000 | — | Absent |
| Comp. Ex. 6 | 0.07 | 0.85 | 1.5 | 0.01 | Φ60 × 20 t (semi-cylindrical) | 650 | 0.1 | Absent |
| Ex. 6 | <0.1 | <0.1 | <0.1 | <0.1 | Φ170 × 85 t | 800 | 0.2 | Absent |
| Ex. 8 | 0.65 | 8.5 | 15 | 0.13 | Φ170 × 85 t | 800 | 2.2 | Present |
| Ex. 9 | 0.65 | 8.5 | 15 | 0.13 | Φ170 × 85 t | 1,000 | 5.5 | Present |

TABLE 4

| | Average density (g/cm³) <maximum value/ minimum value> | Density variation coefficient | Water absorption (%) <minimum value/ maximum value> |
|---|---|---|---|
| Ex. 2 | 2.05 <2.06/2.03> | 0.004 | <0.1 |
| Ex. 6 | 2.02 <2.05/1.99> | 0.008 | <0.1 |
| Ex. 8 | 2.02 <2.06/1.94> | 0.018 | <0.1 |
| Ex. 9 | 2.03 <2.04/2.02> | 0.004 | <0.1 |
| Comp. Ex. 5 | 2.12 <2.19/1.92> | 0.034 | <0.1 <(<0.1)/0.13> |

Figure 28:
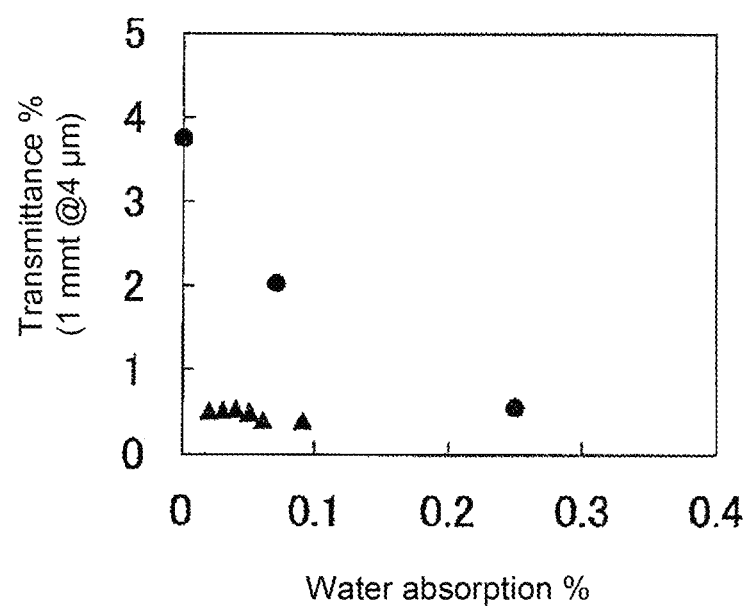
FIG. 28 is a diagram showing the relationship between the water absorption and the transmittance at a wavelength 4

In FIG. 28, with respect to the relationship between the water absorption and the transmittance at a wavelength of 4 μm, Examples 1 to 4 are plotted by symbol ▲. The opaque quartz glass prepared by adding a pore forming agent had a low transmittance, and a low water absorption.

In the foregoing, the present invention has been described in detail and with reference to specific embodiments thereof, however, it is apparent to those skilled in the art that various changes and modifications can be made without departing from the spirit and scope of the present invention.

The entire disclosures of Japanese Patent Application No. 2014-027910 filed on Feb. 17, 2014, Japanese Patent Application No. 2014-040971 filed on Mar. 3, 2014 and Japanese Patent Application No. 2014-094127 filed on Apr. 30, 2014, including specifications, claims, drawings and summaries are incorporated herein by reference in their entireties.

INDUSTRIAL APPLICABILITY

The present invention provides opaque quartz glass having high heat shielding effects and a method for its production, which can be suitably used for a member for semiconductor production equipment.

The invention claimed is:

1. Opaque quartz glass characterized in that the density is at least 1.95 g/cm³ and at most 2.15 g/cm³, the average pore diameter is from 5 to 20 μm, the linear transmittance at a wavelength of from 1.5 μm to 5 μm when the sample thickness is 1 mm, is at most 1%, and the water absorption is at most 0.1 wt %.

2. The opaque quartz glass according to claim 1, characterized in that the density is at least 1.97 g/cm³ and at most 2.08 g/cm³.

3. The opaque quartz glass according to claim 1, characterized in that the average pore diameter is from 9 to 15 μm.

4. The opaque quartz glass according to claim 1, characterized in that the diffuse reflectance at a wavelength of 2 μm when the sample thickness is 3 mm, is at least 70%.

5. The opaque quartz glass according to claim 1, characterized in that the cristobalite content is at most 2%.

6. The opaque quartz glass according to claim 1, characterized in that the coefficient of variation of density is at most 0.02.

7. The opaque quartz glass according to claim 1, characterized in that the content of each metal impurity of Na, Mg, Al, K, Ca, Cr, Fe, Cu and Zn is at most 10 ppm.

8. The opaque quartz glass according to claim 1, characterized in that the content of each metal impurity of Na, Mg, Al, K, Ca, Cr, Fe, Cu and Zn is at most 1 ppm.

9. A method for producing opaque quartz glass as defined in claim 1, characterized by mixing a pore forming agent powder to an amorphous silica powder so that its volume ratio to the amorphous silica powder would be at least 0.04, molding the mixed powder, and heating at a temperature at which the pore forming agent is burnt off, to remove the pore forming agent, followed by sintering at a temperature at which sintering of the silica powder progresses, until pores contained in the sintered body become closed pores.

10. The method for producing opaque quartz glass according to claim 9, characterized in that the pore forming agent powder has an average particle size of from 5 to 40 μm, and the addition amount of the pore forming agent powder is from 0.04 to 0.35 by volume ratio to the amorphous silica powder.

11. The method for producing opaque quartz glass according to claim 9, characterized in that the pore forming agent powder has an average particle size of from 9 to 30 μm.

12. The method for producing opaque quartz glass according to claim 9, characterized in that the pore forming agent powder is a graphite powder.

13. The method for producing opaque quartz glass according to claim 9, characterized in that the amount of each metal impurity of Na, Mg, Al, K, Ca, Cr, Fe, Cu and Zn contained in the mixed powder, is at most 10 ppm.

14. The method for producing opaque quartz glass according to claim 9, characterized in that the production is conducted under such a condition that the cristobalite content in the sintered body would be at most 2%.

15. The method for producing opaque quartz glass according claim 9, characterized in that the aspect ratio of the pore forming agent powder is at most 3.0.

16. The method for producing opaque quartz glass according to claim 9, characterized in that the atmosphere for the heating is an oxidizing atmosphere.

17. The method for producing opaque quartz glass according to claim 9, characterized in that the average particle size of the amorphous silica powder is at most 20 μm.

18. Quartz glass characterized by having a transparent quartz glass layer on a part or whole of the surface of the opaque quartz glass as defined in claim 1.

19. A member for a heat treatment apparatus, characterized in that a part or whole thereof is formed of the opaque quartz glass as defined in claim 1.

20. A member for a semiconductor producing apparatus, characterized in that a part or whole thereof is formed of the opaque quartz glass as defined in claim 1.

21. A member for a FPD producing apparatus, characterized in that a part or whole thereof is formed of the opaque quartz glass as defined in claim 1.

22. A member for a solar cell producing apparatus, characterized in that a part or whole thereof is formed of the opaque quartz glass as defined in claim 1.

23. A member for a LED producing apparatus, characterized in that a part or whole thereof is formed of the opaque quartz glass as defined in claim 1.

24. A member for a MEMS producing apparatus, characterized in that a part or whole thereof is formed of the opaque quartz glass as defined in claim 1.

25. An optical member characterized in that a part or whole thereof is formed of the opaque quartz glass as defined in claim 1.

* * * * *